Oct. 14, 1947.                R. SHEPPARD                2,429,077
                         PRIME MOVER POWER PLANT
                       Original Filed Dec. 17, 1943
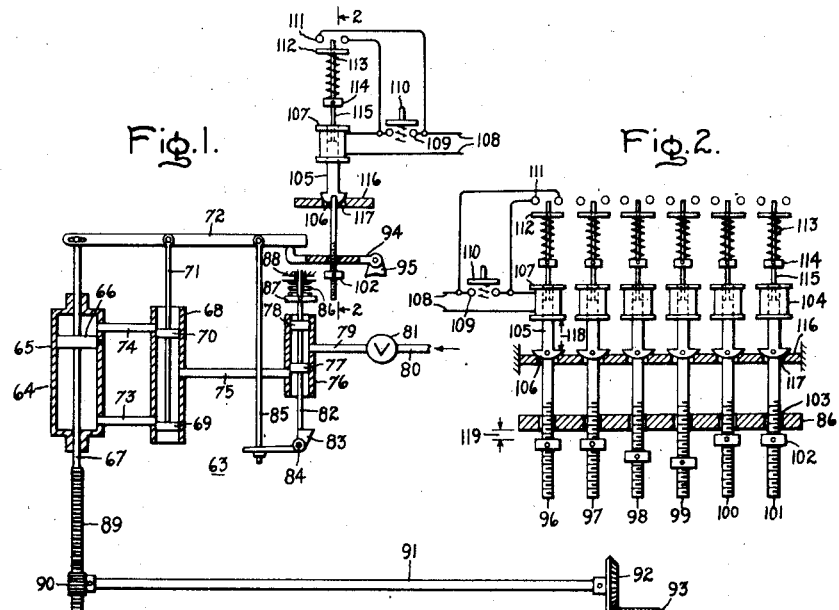
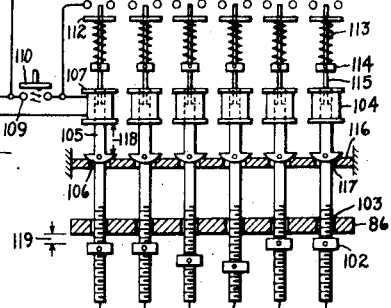
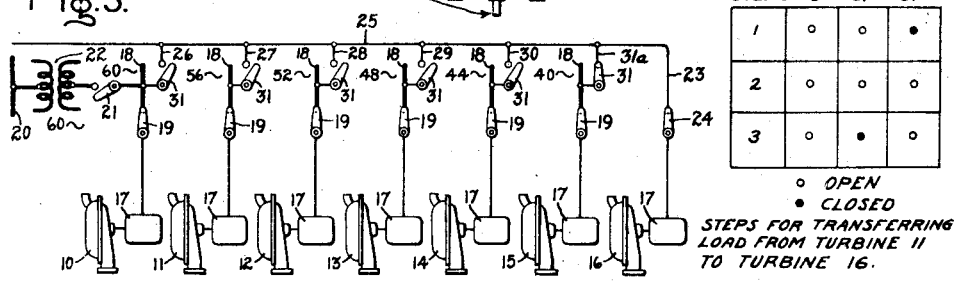
Inventor:
Raymond Sheppard,
by Prowell & Mack
His Attorney.

Patented Oct. 14, 1947

2,429,077

UNITED STATES PATENT OFFICE 2,429,077

PRIME MOVER POWER PLANT

Raymond Sheppard, Niskayuna, N. Y., assignor to General Electric Company, a corporation of New York Original application December 17, 1943, Serial No. 514,678. Divided and this application September 25, 1945, Serial No. 618,533

5 Claims. (Cl. 290—4)

The present invention relates to prime mover power plants including a plurality of prime movers of which one is to function as an emergency standby and each of the others normally is to carry a fixed base load at a certain speed differing from the speeds of the others. In such plants it is desirable upon failure of a base load-carrying machine at any time to be able to transfer the load to the standby prime mover and have any one of the prime movers adapted to act as a standby.

One object of my invention is to provide an improved construction and arrangement of power plants of the type above specified whereby the load may be readily and quickly transferred from one of several prime movers to a standby prime mover.

Another object of my invention is to provide an improved governing mechanism for prime movers whereby a prime mover may be quickly brought up to a certain speed to carry a fixed load or a variable load within a limited speed range.

This is a division of application Serial No. 514,678, filed on December 17, 1943, and assigned to the same assignee as the present application.

For a consideration of what I believe to be novel and my invention, attention is directed to the following description and the claims appended thereto in connection with the accompanying drawing.

In the drawing Fig. 1 illustrates a prime mover with a control mechanism embodying my invention; Fig. 2 is a view along the line 2—2 of Fig. 1; Fig. 3 is a diagrammatic view of a power plant embodying my invention; and Fig. 4 illustrates the sequence in which various switches must be opened and closed to effect the load transfer hereinafter described.

In the present example I have illustrated a power plant with a plurality of prime movers in the form of turbines for driving generators at certain frequencies. The arrangement includes seven turbines 10, 11, 12, 13, 14, 15 and 16 each coupled to drive a generator 17 to furnish electric power to separate electric lines or bus bars 18 connected to the respective generators through circuit breakers 19. The turbines 10 to 15 are operated at speeds at which certain frequencies are maintained in the several lines 18. These frequencies in the present instance have been indicated on the bus bars as being 60, 56, 52, 48, 44 and 40 cycles respectively. The line 18 associated with the turbine 10 operating at a standard frequency of 60 cycles is also connected to a standard 60-cycle power line 20 through a connection including a circuit breaker 21 and a transformer 22.

Let us assume that each of the turbines 10 to 15 and the generators driven thereby carries a base load of 20,000 kw. at the indicated frequencies of 40, 44, 48 cycles, etc., and that the turbine 16 with its generator is to function as a standby. According to my invention means are provided for electrically interconnecting the emergency standby prime mover or turbo-generator with the prime mover operating at lowest speed, in the present instance with the turbo-generator including the turbine 15 operating at 40 cycles. The generator associated with the turbine 16 is connected by a conductor 23 including a normally closed circuit breaker 24 to the line 18 associated with the turbine 15. The inlet valve of the turbine 16 is slightly opened to keep such turbine idling at a frequency of 40 cycles. Preferably the inlet valve of the turbine 16 is opened sufficiently to cause the turbine to carry a certain load. Thus, if a load of 20,000 kw. is required in the 40 cycle line, it may be desirable to divide such load so that the turbine 15 carries 18,000 kw. and the turbine 16 2000 kw. Carrying such medium load on the turbine 16 facilitates the transfer of higher loads to the turbine without setting up heat stresses therein.

If during operation any of the turbines 10 to 15, which may be termed "base load" turbines, becomes inoperative or if the frequency in any of the lines 18 drops below a certain value, it is desirable to transfer the load from the respective turbine to the emergency standby turbine 16. Thus, if the frequency in the 56 cycle line associated with the turbine 11 should drop from 56 cycles below 54 cycles, it is desirable to transfer the load from the turbine 11 and its generator to the turbine 16 and the generator associated therewith. To this end, as indicated diagrammatically, the generator driven by the turbine 16 may be electrically connected by a conductor 25 and conductors 26, 27, 28, 29 and 30 to the generators of the turbines 10 to 14 respectively. Each of these conductors includes a circuit breaker 31 corresponding to the conductor 23 and the circuit breaker 24 respectively. Thus, upon failure of the turbine 11 circuit breaker 19 in the 56 cycle line and breaker 31 in conductor 31a are opened instantly and the circuit breaker 31 in conductor 27 is instantly closed whereby the load required on the 56-cycle line is automatically furnished from the turbine 16 after the latter has been brought up to a speed corresponding to 56 cycles. Subsequent to such transfer any fault in the turbine 11 or its generator may be remedied and such turbine and generator then may be brought up to normal speed and by closing circuit breaker 19 may be put back on the 56 cycle line. Thereafter, the 56 cycle load may be transferred back to turbine 11 and its generator from turbine 16 and the latter may again operate in its normal capacity as an emergency standby unit.

In order to permit quick load transfer to any turbo-generator it is provided with a turbine governing mechanism which may be quickly adjusted to bring the turbine up to a certain speed and to carry a certain load at such speed. In addition to the load transfer means that must be embodied in such mechanism it also must include like any ordinary governing mechanism a means for manually or remotely setting or varying the load on the turbine. Such a mechanism is shown in Figs. 1 and 2. Fig. 1 shows a turbine which may be any one of the turbines 10 to 16 having an inlet valve 35 for controlling the flow of elastic fluid thereto. The valve is actuated by a normal governing mechanism which includes a speed governor 36 driven from the turbine, a pilot valve 37 actuated by the speed governor, and a hydraulic motor 38 in which the displacement of operating fluid is controlled by the pilot valve 37. The motor 38 has a piston 39 biased downward by a spring 40 against the fluid pressure in the pressure chamber formed below the piston 39. The piston 39 has a stem 41 connected at its lower end to the valve 35 and at its upper end to the left-hand end of a control and follow-up lever 42. The pilot valve 37 includes a casing 43 having an inlet port 44, a discharge port 45 and a supply port 46 connected to the pressure chamber of the motor 38. A pilot valve bushing 47 is slidably disposed in the casing 43 and connected at its upper end to an intermediate point of the lever 42. The bushing has ports cooperating with the ports 44, 45 and 46. A movable valve member with an upper valve head 48 and a lower valve head 49 is slidably disposed within the bushing and connected to the speed governor 36.

During operation an increase in turbine speed causes outward movement of the flyweights of the speed governor whereby the valve heads 48, 49 are moved downward and permit the discharge of fluid from the servo motor through the pilot valve, resulting in downward movement of the piston 39 and closing movement of the turbine valve 35. Downward movement of the piston 39 simultaneously causes counterclockwise movement of the follow-up lever 42 about its right-hand end effecting movement of the bushing 47 whereby the latter is restored to its normal relative line-in-line position with the heads 48, 49.

Similarly, a decrease in turbine speed causes upward movement of the pilot valve heads 48, 49 by action of the governor 36 whereby fluid under pressure is conducted from a source, not shown, through the port 44 of the pilot valve and discharged from the supply port 46 thereof to the servo motor 38, thus raising the pressure below the piston 39, causing upward movement of the latter and resulting in opening movement of the valve 35. Upward movement of the piston 39 causes clockwise turning movement of the follow-up lever 42, thus raising the pilot valve bushing 47 and moving it into its line-in-line position with the pilot valve heads 48, 49.

The right-hand end of the lever 42 is connected to a synchronizing device or speed setting means 50 to vary the load output of the turbine at a certain speed or to vary its speed in order to maintain a certain frequency. This synchronizing means in the present example comprises an axially fixed rotatable screw 51 engaged by a nut 52 which is pivotally supported on the right-hand end of the lever 42. Upon rotation of the screw 51 the nut 52 travels up or down, depending upon the direction of rotation. Two adjustable stops 53 and 54 are secured to the screw 51 to limit movement of the nut 52 and the speed of the turbine. In the present example the upper nut 53 may be set to limit the minimum speed to 40 cycles and the nut 54 may be set to limit the maximum desirable speed of the turbine to 60 cycles corresponding to the minimum and maximum speeds of the turbines 10 to 16. Rotation of the synchronizing screw 51 is accomplished by means of a synchronizing motor 55 which may be remotely controlled and which is connected to rotate the screw by means of a worm gear 56 and a coupling 57. The coupling 57 is of the friction type having a lower half 58 and rigidly fastened to the worm gear and an upper half 59 frictionally engaging the lower half 58 and connected to the lower end of the screw 51 by means of a slot and pin connection 60. The upper half 59 is biased downward into engagement with the lower half 58 by a compression spring 61 engaging the upper half 59 and a spring plate 62 secured to the screw 51. During operation, rotation of the worm gear by action of the motor 55 causes rotation of the screw 51 through the friction coupling 57.

The lever 42, more particularly the upper end of the synchronizing screw 51, is connected to a load transfer device 63 which broadly constitutes a mechanism for selectively setting the speed-governing mechanism to operate the turbine at any one of a number of fixed speeds or speed ranges. The load transfer device according to my invention comprises a servo motor 64 having a cylinder 65 with a piston 66 movably disposed therein and connected to a stem 67. The motor is controlled by a pilot valve 68 having heads 69, 70 connected to a stem 71 which at its upper end is pivotally connected to the intermediate point of a control and follow-up lever 72 having a left-hand end pivotally connected to the stem 67 of the hydraulic motor 64. The pilot valve has ports connected by conduits 73, 74 to pressure chambers formed below and above the piston 66 respectively. Fluid under pressure is conducted to the pilot valve 68 through a conduit 75 having one end connected to an inlet port of the valve 68 and another end connected to a valve 76. The latter in the present instance is in the form of a spring-biased pilot valve having two heads 77 and 78 for controlling the flow of fluid from an inlet port 79 to the conduit 75. The inlet port 79 is connected to a supply conduit 80 including a valve 81. In the position shown the valve 76 is closed, the head 77 disconnecting the inlet port 79 from the conduit 75, thus preventing the flow of operating fluid under pressure through the valve 76. In this position the load transfer or selective speed setting mechanism is out of operation and the piston 66 of the hydraulic motor 65 is near or in an upper end position. The pilot valve heads 77, 78 are connected to a stem 82 which normally is held in the position shown by means of a latch 83 pivotally held on a fulcrum 84 with the latch member engaging the lower end of the pilot valve stem 82 and an arm pivotally connected by a link 85 to the aforementioned lever 72. Upon counterclockwise turning movement of the lever 72 about its left-hand end the latch 83 is rotated clockwise about the fulcrum 84 and thereby removed from the lower end of the pilot valve stem 82. Upon such removal or unlatching it is desirable to effect quick downward movement of the pilot valve heads to move the valve in fully open position. To this end a compression spring 86 is associated with the upper end of the pilot valve stem 82, bearing at its lower end against a collar 87 secured to the pilot valve stem and at its upper end against a fixed support 88. Upon unlatching of the latch 83 the pilot valve heads are forced downward by action of the spring 86 into a lower end or opening position in which the spring plate 87 engages the upper end of the pilot valve casing. Upon downward movement of the valve head 77 communication is established between the inlet port 79 and the conduit 75 so that fluid under pressure may be supplied to the conduit 75 as long as the valve 81 is in open position. As pointed out above, reversing of the position of the valve heads 77, 78 is accomplished by counterclockwise movement of the lever 72 about its left-hand end. Such counterclockwise movement also causes upward movement of the heads 69, 70 of the pilot valve 68, thus permitting the flow of operating fluid under pressure from conduit 75 through the pilot valve 68 and the conduit 74 into the upper pressure chamber of the hydraulic motor 64, causing downward movement of the piston 66 until the valve heads 69, 70 have been brought into line-in-line position with the ports connected to the two conduits 73, 74 respectively by the follow-up action of the lever 72.

Movement of the piston 66 is transmitted to the synchronizing screw 51 to effect setting of the speed governor 36 and positioning of the turbine inlet valve 35. To this end an extension of the hydraulic motor stem 67 is provided with a rack 89 meshing with a pinion 90 secured to the left-hand end of a rotatable shaft 91 which at its right-hand end carries a bevel gear 92 meshing with another bevel gear 93 secured to the upper end of the screw 51. Downward movement of the rack 89 causes rotation of the screw 51 in the direction in which the nut 52 is moved downward to effect opening of the valve 35 and increase of the turbine speed. More specifically, as described above, downward movement of the nut 52 causes clockwise turning movement of the lever 42 about its left-hand end whereby the bushing 47 is moved downward to admit fluid under pressure from the port 44 of the pilot valve 37 and the supply port 46 thereof into the pressure chamber of the hydraulic motor 38 causing upward movement of the piston 39 and opening of the turbine valve 35. Upon upward movement of the piston 39 the lever 42 turns clockwise about its right-hand end, thus moving the bushing 47 upward and restoring it to its normal line-in-line position with the heads 48, 49.

Whenever one of the turbines 10 to 16 functions as an emergency standby, its valve 81 of the load transfer mechanism is opened, thus bringing fluid pressure to the valve 76 which latter is kept in the position shown in Fig. 1 by engagement of its stem 82 with the latch 83. In this position the pressure chambers in the motor 64 are empty of fluid under pressure, thus permitting free movement of the piston 66 within the cylinder 65. This is important because it precludes interference with the normal operation of the synchronizing mechanism 50 of the arrangement. As previously pointed out, during load-setting by the synchronizing mechanism the screw 51 is rotated. This causes rotation through the bevel gears 93, 92 of the shaft 91 necessitating free sliding movement of the piston 66 within the cylinder 65 of the motor 64. This is assured by closing of the valve 81 which effects drainage of fluid from the servo motor 64. Such free movement of the motor 64 does not affect normal governing operation and remote load and speed-setting of the mechanism. Vice versa, it is equally important to permit load transfer without interfering with the action of the synchronizing motor. In other words, it must be possible to rotate the synchronizing screw 51 by action of the load transfer mechanism 63. This is accomplished by the provision of the friction clutch 57. During rotation of the screw 51 by action of the motor 64 the lower half 58 of the clutch 57 remains stationary and the upper half 59 rotates relative to the lower half 58 while frictionally engaging the latter. The setting of the mechanism by the load transfer device depends upon the angular degree of rotation of the screw 51 which in turn is initiated and depends upon the initial counterclockwise turning movement of the lever 72 of the load transfer mechanism.

According to my invention means are cooperatively associated for actuating the lever 72 to effect any one of a number of definite angular movements thereof. In the present example the right-hand end of the lever 72 is engaged by and loosely supported on the left-hand end of a lever or load transfer plate 94 which at its right-hand end is held on a fulcrum 95. Clockwise turning movement of the lever or plate 94 lifts the right-hand end of the lever 72 and thus initiates load transfer to or speed setting of the turbine. The degree of opening of the valve 35 is dependent upon the degree of clockwise movement of the lever 94.

The arrangement includes means for turning the lever 94 different fixed amounts to change the speed of the turbine when acting as an emergency standby to the different speeds at which the base load turbines are operated. This means in addition to the lever 94 comprises a set of threaded rods 96, 97, 98, 99, 100 and 101, corresponding to the number of base load turbines. Each rod 96 to 101 carries an adjustable stop in the form of a nut 102 threaded on and locked to the respective rod. The different stops 102 are located below and cooperatively associated with the lever or plate 94 to form with the latter different lost motion connections.

The upper portions of the rod project through openings 103 of the lever 94 and have upper ends connected to separate relays or electromagnets 104. Each relay has a core 105 with a shoe 106 at its lower end connected by a pivot to one of the rods 96—101. The core is cooperatively associated with an energizing coil 107 connected to an electric circuit 108 which includes contacts 109 and a contact-closing member 110. Upon closing of a pair of contacts 109 by the contact-making member 110 the respective coil 107 is energized and its core 105 is forced upward until the shoe 106 thereof engages the lower face of the coil 107. Once a pair of contacts 109 is closed it is desirable to maintain them closed. This is accomplished by a pair of holding contacts 111 connected in parallel to the contacts 109 and cooperatively associated with a contact-making member 112 loosely held at the upper end of a spring 113 which at its lower end engages a stop 114 secured to a rod 115 moved by the core 105. Thus, upon energization of a relay coil its core is forced upward into an end position, as described above, causing simultaneously upward movement of the contact-making member 112 to close the holding contacts 111. The member 112 is biased against the contacts 111 by action of the respective spring 113 to assure good contact connection.

The shoes of the several cores in their deenergized conditions engage a support in the form of fixed plate 116 having a plurality of openings 117 forming seats for the respective shoes 107 and accommodating the upper ends of the threaded rods 96 to 101. Each core upon actuation has a fixed stroke indicated by the numeral 118. Each stop or projection 102 is spaced from the lower surface of the lever or plate 94 a distance indicated by numeral 119 with regard to the rod 96. Upon closing of the relay associated with the rod 96 the latter upon engagement between its stop 102 and the lever 94 turns the latter upward a fixed distance which is equal to the difference between the length of the stroke 118 and the distance or spacing or length of the lost motion 119.

The several relay circuits 104, more particularly the contacts 109 and the contact-making member 110, may be actuated manually or they may be actuated automatically in response to certain minimum speed or frequency conditions of the different turbo-generators. Thus, if it is desired in the arrangement of Fig. 3 to transfer the load from the turbine 10 to the turbine 16 and to increase the speed of the latter from one of 40 cycles to one of 60 cycles the rod 101 may be actuated by closing the circuit of its relay 104 in order to turn the lever 94 a maximum distance. The rod 99 which upon actuation effects a minimum turning movement of the lever 94 may be actuated or may have its relay circuit closed when it is desired to transfer the load from the turbine 14 to the turbine 16 in Fig. 3.

Thus, with an arrangement according to my invention one of a number of turbines may operate either as a standby or as a base load turbine and the load of any one of a number of normally acting base load turbines may at any time be transferred to the standby turbine. The latter, as previously pointed out, is preferably operated at low load and connected to the lowest speed turbo-generator. Thus the load may at any time be quickly transferred from the low speed base load turbo-generator to the standby turbo-generator. During operation of the turbo-generator normally acting as an emergency standby its valve 81 is opened to keep the load transfer mechanism in readiness for operation. After load transfer such turbine then operates as a base load turbine or turbo-generator and its valve 81 must be closed to empty its servo-motor 64 in order to prevent interference with the operation of its synchronizing mechanism.

What I claim as new and desire to secure by Letters Patent of the United States, is:

1. In a power plant, a plurality of prime movers driving electric generators, one of the prime movers being arranged normally to act as an emergency standby, each of the other prime movers normally acting as a base load machine carrying a certain load at a certain speed differing from the speed of the other base load carrying prime movers, means interconnecting the emergency standby prime mover with the base load carrying prime mover operated at the lowest speed, and means for transferring the load from any prime mover to the emergency standby prime mover.

2. In a power plant, a plurality of prime movers, one of the prime movers driving electric generators, being arranged normally to act as an emergency standby, each of the other prime movers normally acting as a base load machine carrying a certain load at a certain speed differing from the speeds of the other base load carrying prime movers, means interconnecting the emergency standby prime mover with the base load carrying prime mover operated at the lowest speed, and means for transferring the load from any prime mover to the emergency standby prime mover, each prime mover comprising a governing mechanism for normally controlling the prime mover when carrying a base load and including means for quickly raising its speed a certain fixed amount to transfer load to such prime mover when operating as an emergency standby.

3. In a power plant, a plurality of turbo-generators each comprising an elastic fluid turbine and a generator driven by the turbine means normally operating all but one turbo-generator as base load carrying machines at substantially fixed speeds differing from each other, and means for operating one turbo-generator as an emergency standby and interconnecting its generator with the lowest speed generator, each turbine including valve means for controlling the flow of operating fluid thereto and a governing mechanism for controlling the valve means, comprising means responsive to the respective turbine speed and selective speed-setting means for changing the speed of such turbine to that of any other turbine.

4. In a power plant, a plurality of turbo-generators each comprising an elastic fluid turbine and a generator driven by the turbine, one of the turbo-generators being normally operated as an emergency standby, each other turbo-generator being normally operated as a base load machine at a substantially fixed frequency differing from the frequencies of the other base load machines, means electrically interconnecting the emergency standby turbo-generator with the lowest frequency turbo-generator, and a separate governing mechanism for each turbine to control its speed and to permit quick transfer of load between any two turbines operated as base load and standby machines respectively.

5. In a power plant, a plurality of turbo-generators each comprising an elastic fluid turbine and a generator driven by the turbine, one of the turbo-generators being normally operated as an emergency standby, each other turbo-generator being normally operated as a base load machine at a substantially fixed frequency differing from the frequencies of the other base load machines, means electrically interconnecting the emergency standby turbo-generator with another turbo-generator, and a separate governing mechanism for each turbine to control its speed and to permit quick transfer of load between any two turbines operated as base load standby machines respectively, said governing mechanism comprising speed governing means and selective speed-seting means connected to the speed governing means for selectively changing the speed of any turbine to the speed of any other turbine.

RAYMOND SHEPPARD.

REFERENCES CITED

The following references are of record in the file of this patent:

UNITED STATES PATENTS

| Number | Name | Date |
|---|---|---|
| 1,633,167 | Davis | June 21, 1927 |
| 1,648,848 | Huguenin | Nov. 8, 1927 |
| 1,671,047 | Pfau | May 22, 1928 |
| 1,873,955 | Creager | Aug. 30, 1932 |
| 1,899,556 | Caughey | Feb. 28, 1933 |
| 1,984,187 | Hayward et al. | Dec. 11, 1934 |
| 2,039,426 | Kerr | May 5, 1936 |
| 2,165,983 | Schmer | July 11, 1939 |
| 2,224,321 | Schwendner | Dec. 10, 1940 |
| 2,228,153 | Pfau | Jan. 7, 1941 |
| 2,239,602 | Gottlieb | Apr. 22, 1941 |